United States Patent
Wueest

(10) Patent No.: US 11,303,670 B1
(45) Date of Patent: Apr. 12, 2022

(54) PRE-FILTERING DETECTION OF AN INJECTED SCRIPT ON A WEBPAGE ACCESSED BY A COMPUTING DEVICE

(71) Applicant: CA, Inc., San Jose, CA (US)

(72) Inventor: Candid Alex Wueest, Bassersdorf (CH)

(73) Assignee: CA, Inc., New York, NY (US)

( * ) Notice: Subject to any disclaimer, the term of this patent is extended or adjusted under 35 U.S.C. 154(b) by 322 days.

(21) Appl. No.: 16/435,179

(22) Filed: Jun. 7, 2019

(51) Int. Cl.
*H04L 29/06* (2006.01)
*H04L 67/56* (2022.01)
*G06F 21/53* (2013.01)
*G06N 20/00* (2019.01)
*H04L 67/02* (2022.01)

(52) U.S. Cl.
CPC .......... *H04L 63/1466* (2013.01); *G06F 21/53* (2013.01); *G06N 20/00* (2019.01); *H04L 63/0281* (2013.01); *H04L 63/101* (2013.01); *H04L 63/145* (2013.01); *H04L 63/1416* (2013.01); *H04L 67/28* (2013.01); *G06F 2221/034* (2013.01); *H04L 67/02* (2013.01)

(58) Field of Classification Search
CPC ............ H04L 63/1466; H04L 63/0281; H04L 63/101; H04L 63/1416; H04L 63/145; H04L 67/28; H04L 67/02; G06N 20/00; G06F 21/53; G06F 2221/034
See application file for complete search history.

(56) References Cited

U.S. PATENT DOCUMENTS

| | | | | |
|---|---|---|---|---|
| 7,661,136 B1 * | 2/2010 | Spielman | ............ | H04L 63/1416 726/22 |
| 9,230,105 B1 * | 1/2016 | Satish | ............ | G06F 21/64 |
| 9,479,519 B1 * | 10/2016 | Hill | ............ | H04L 63/1441 |
| 9,531,736 B1 * | 12/2016 | Torres | ............ | H04L 63/1441 |
| 9,830,453 B1 * | 11/2017 | Feiertag | ............ | G06F 21/562 |

(Continued)

OTHER PUBLICATIONS

Lynn Marks. Client-Side Protection: How Formjacking Attacks Work (and How to Prevent Them). Imperva Community. Oct. 12, 2020 [retrieved Nov. 12, 2021], <URL: https://community.imperva.com/blogs/lynn-marks1/2020/10/21/client-side-protection-how-formjacking-attacks> (Year: 2020).*

(Continued)

*Primary Examiner* — Jeremy S Duffield
*Assistant Examiner* — Zhe Liu
(74) *Attorney, Agent, or Firm* — Adsero IP

(57) ABSTRACT

Pre-filtering detection of an injected script on a webpage accessed by a computing device. The method may include receiving an indication of access to the webpage at a web browser of the computing device; identifying a web form associated with the webpage; determining that the webpage has been previously visited by the computing device; recording at least one current domain associated with at least one current object request made by the web form; determining a difference of a count of the at least one current domain associated with the at least one current object request and a count of at least one historical domain associated with at least one historical object request previously made by the webpage; identifying the webpage as suspicious based on determining that the difference is greater than zero and less than a domain threshold; and initiating a security action on the webpage based on the identifying.

20 Claims, 4 Drawing Sheets

(56) References Cited

U.S. PATENT DOCUMENTS

| | | | | |
|---|---|---|---|---|
| 10,747,881 B1* | 8/2020 | Luo | ................... | H04L 63/1491 |
| 2008/0172738 A1* | 7/2008 | Bates | ................. | G06F 16/9566 726/22 |
| 2011/0239288 A1* | 9/2011 | Cross | ..................... | G06F 21/55 726/11 |
| 2012/0054869 A1* | 3/2012 | Yen | ................. | H04L 29/12066 726/24 |
| 2015/0339479 A1* | 11/2015 | Wang | ................ | G06F 21/6263 726/22 |
| 2017/0213032 A1* | 7/2017 | Zhang | ................... | H04L 29/06 |

OTHER PUBLICATIONS

Riskiq; "The World Leader in Attack Surface Management"; website; located at: https://www.riskiq.com/; 2016-2019; accessed on Jun. 7, 2019; 2 pages.

Wikipedia, The Free Encyclopedia; "Content Security Policy"; webpage located at: https://en.wikipedia.org/wiki/Content_Security_Policy; Nov. 12, 2018; 5 pages.

A Medium Corporation; "Meet Formjacking, a Major E-Commerce Website Attack"; webpage located at: https://medium.com/@oakey/meet-formjacking-a-major-e-commerce-website-attack-f741382c9dc6; Dec. 7, 2018; 4 pages.

Loeb, Larry; "Magecart Group Likely Behind Increase in Formjacking Attacks"; Security Now, Light Reading; Website; located at https://www.securitynow.com/author.asp?section_id=649&doc_id=746418; Sep. 28, 2018; 2 pages.

Rash, Wayne; "You Need to Protect Your Website Against Formjacking Right Now"; Website: PC, PC Magazine; located at: https://uk.pcmag.com/feature/119839/you-need-to-protect-your-website-against-formjacking-right-now; Feb. 27, 2019; 4 pages.

Kinlan, Paul; "Dectecting Injected Content from Third-Parties on Your Site"; website located at: https://pauLkinlan.me/detecting-injected-content/; Mar. 5, 2019; 7 pages.

Software Testing Help; "JavaScript Injections Tutorial: Test and Prevent JS Injection Attached on Website" Blog; located at: https://www.softwaretestinghelp.com/javascript-injection-tutorial/; Apr. 23, 2019; 6 pages.

Buber; Ebubekir; "How Companies are Hacked via Malicious Javascript Code?"; ITNEXT Webpage; located at: https://itnext.io/how-companies-are-hacked-via-malicious-javascript-code-12aa82560bdc; Feb. 15, 2018; 11 pages.

Manvar, Neil; "Capture Contecnt Security Policy (CSP) Violations with Sentry"; Blog; located at https://blog.sentry.io/2018/09/04/how-sentry-captures-csp-violations; Sep. 4, 2018; 5 pages.

* cited by examiner

US 11,303,670 B1

PRE-FILTERING DETECTION OF AN INJECTED SCRIPT ON A WEBPAGE ACCESSED BY A COMPUTING DEVICE

BACKGROUND

Malicious attacks online in the form of formjacking are becoming increasingly common and prolific. With formjacking, attackers may inject malicious scripts (e.g., JavaScript) into webpages using web forms to gather personal and sensitive user information. Without the user being aware of the attack, the attacker may steal private and sensitive information, including personal identification information, financial information, passwords, etc.

Some current estimates put the number of webpages infected with formjacking at over 5000 a month, with millions of potential web forms being compromised each month. Thus, an efficient, fast, and cost-effective solution is needed to mitigate and/or prevent formjacking attacks. The subject matter claimed herein is not limited to embodiments that solve any disadvantages or that operate only in environments such as those described above; rather, this background is only provided to illustrate one example technology area where some embodiments described herein may be practiced.

SUMMARY

In some embodiments, a computer-implemented method for pre-filtering detection of an injected script on a webpage accessed by a computing device may be performed, at least in part, by the computing device including one or more processors. The method may include receiving an indication of access to the webpage at a web browser of the computing device; identifying a web form associated with the webpage; determining that the webpage has been previously visited by the computing device; recording at least one current network domain associated with at least one current object request made by the web form; determining a difference of a count of the at least one current network domain associated with the at least one current object request and a count of at least one historical network domain associated with at least one historical object request previously made by the webpage; identifying the webpage as suspicious based on determining that the difference is greater than zero and less than a network domain threshold; and initiating a security action on the webpage based on the identifying.

In some embodiments, the security action may include one or more of adding the webpage to a blacklist, isolating the webpage, blocking network access to the webpage, or transmitting a message to an administrator regarding the webpage.

In some embodiments, receiving of the indication of access to the webpage at the web browser of the computing device may further include receiving the indication of access by way of a browser extension executing in the web browser.

In some embodiments, receiving of the indication of access to the webpage at the web browser of the computing device may further include dynamically executing a security scanning application within the web browser.

In some embodiments, receiving of the indication of access to the webpage at the web browser of the computing device may further include monitoring the web traffic occurring in the web browser with a kernel module.

In some embodiments, receiving of the indication of access to the webpage at the web browser of the computing device may further include receiving a communication from a remote web proxy, the remote web proxy monitoring web traffic between the computing device and a web server associated with the webpage.

In some embodiments, the identifying of the web form associated with the webpage may further include disregarding any webpage not identified as being associated with a web form.

In some embodiments, the method may further include establishing the network domain threshold using a machine learning algorithm.

In some embodiments, after the identifying of the webpage as suspicious, determining that the webpage is malicious by at least one of: visiting the at least one current network domain, passing the at least one current network domain to a sandbox for an automatic malware check, evaluating a digital signature of the at least one current network domain; and determining that the at least one current network domain is on a blacklist.

In some embodiments, a computer device may include a processor, a memory in electronic communication with the processor, and instructions stored in the memory, with the instructions being executable by the processor to perform a method for pre-filtering detection of an injected script on a webpage accessed by a computing device.

In some embodiments, one or more non-transitory computer-readable media may include one or more computer-readable instructions that, when executed by one or more computing devices, cause the one or more computing devices to perform a method for pre-filtering detection of an injected script on a webpage accessed by a computing device.

BRIEF DESCRIPTION OF THE DRAWINGS

Embodiments will be described and explained with additional specificity and detail through the use of the accompanying drawings in which.

DETAILED DESCRIPTION

Figure 1:
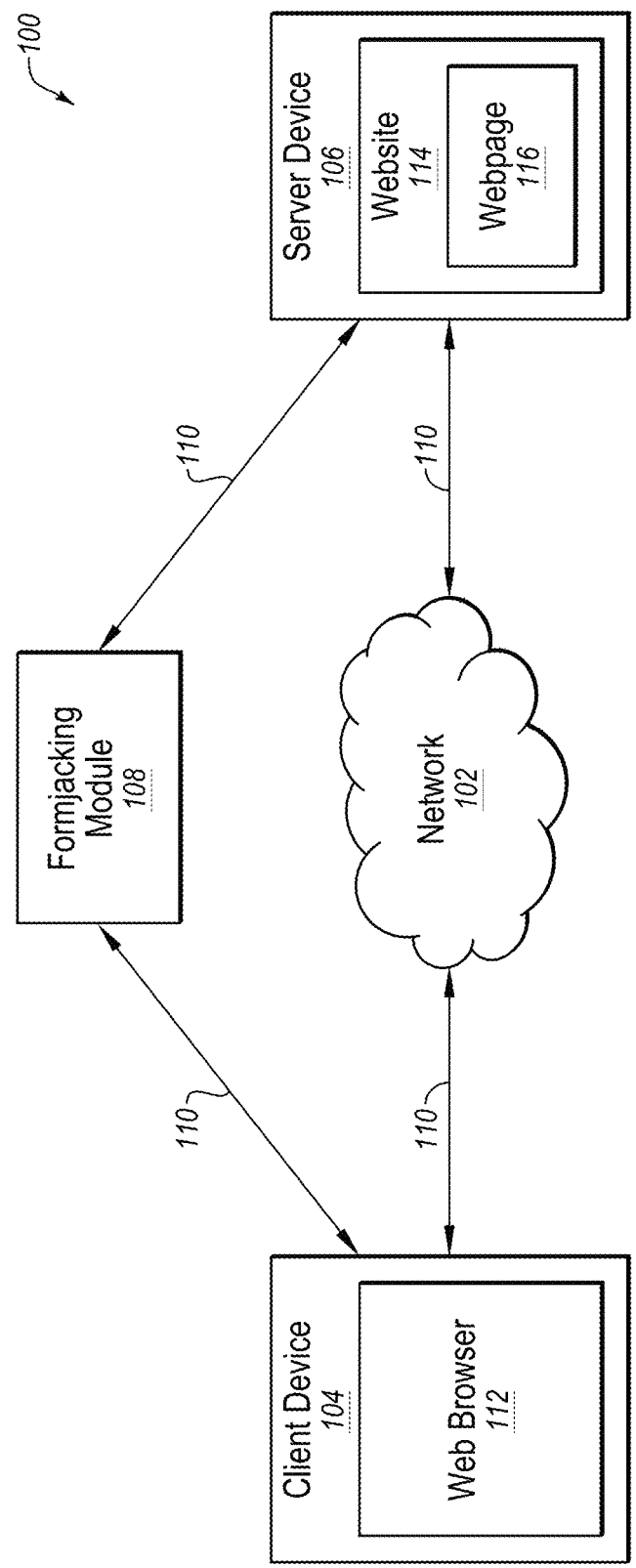
FIG. 1 illustrates an example system configured for pre-filtering detection of an injected script on a webpage accessed by a computing device.

Formjacking attacks are becoming a more common and more prolific way for attackers to obtain personally identifiable information (e.g., Social Security numbers, addresses, phone numbers, passwords, etc.) and other sensitive and/or private information (e.g., financial information, credit card numbers, bank account numbers, etc.). Attackers may inject malicious script onto webpages that contain web forms (e.g., a HyperText Transfer Protocol (HTTP)-based form), where the web forms may be HyperText Markup Language (HMTL) forms into which users enter the personally identifiable and/or sensitive information. In this situation, users likely believe that the entered info is protected by security methods protecting the webpage and/or that the transmission of the entered data is secure. For users, it may be nearly impossible to determine that their critical information is being obtained, copied, and/or sent to an attacker due to the fact that the injected script (e.g., JavaScript) may be very small (e.g., only a few lines of script) and easily obfuscated. Attackers may make small changes in the script, making it difficult to block the scripts using signatures or patterns. In addition, users entering information into web forms do not have a way to know where their entered data is being sent, who is receiving the data, or how or where the data is being stored.

In formjacking attacks, a script may be uploaded as a new script to a server, attackers may modify a script already existing on the server, or attackers may attack a remotely-loaded script called by a webpage. The malicious script may be triggered by one of multiple mechanisms. For example, the script may be triggered when the user clicks on a "submit" button on the web form, or at pre-determined time intervals, such as every five seconds or after a "timeout" timer has expired. At the time the malicious script is triggered, some or all of the form field values into which a user has entered data may be collected and concatenated. The concatenated string may be a long string that includes personally identifiable information, passwords, credit card data, etc. The string may then be obfuscated using encryption techniques, and transmitted to a remote server (e.g., using a GET or POST request, using an invisible form, using a one-to-one pixel image graphic to receive and encode data from the user, etc.).

The server may be owned and controlled by an attacker (e.g., typo-squatting), or may be a domain with a historically good reputation that has been hacked. In some embodiments the obtained data may be stored locally on the compromised computing device (e.g., in a local cache, in a database in memory, etc.). In an embodiment where the data is stored locally, the attacker may need to retrieve the data again at the later time, making it more likely that the attacker will be detected.

Previous solutions may include programs that crawl all available webpages, or scan all of the scripts on a server. Other solutions may include the use of domain (e.g., universal resource locator (URL)) blacklists and whitelists, or other data loss prevention techniques to detect a pattern of data exfiltration. However, these solutions may require large amounts of processing power. In addition, it may take hours or days to lookup domains on a blacklist, or to add domains to a blacklist.

The methods and systems described herein may solve the above and other related problems by comparing web request sequences made by a web browser to previously recorded web request sequences for the same webpage during a previous visit. The number of domains that need to be analyzed may be reduced to only those webpages having web form resources and where only one or two new additional requests (or some other number below a threshold) to new domains are made. This solution may result in the identifying of suspicious domains, but may do so by reducing the number of suspicious domains that need to be analyzed by pre-filtering the domains before analysis is done. By pre-filtering, and thus saving resources and time at the front end, a faster and more thorough analysis can be done on domains marked as suspicious.

Turning to the figures, FIG. 1 illustrates an example system configured for pre-filtering detection of an injected script on a webpage 116 accessed by a computing device (where webpage 116 may be one of many webpages that make up website 114). The system 100 may include a network 102, a client device 104, a server device 106, and a formjacking module 108. In some embodiments, the formjacking module 108 may execute on a standalone device that communicates with the client device 104 and the server device 106. In other embodiments, however, the formjacking module 108 may be part of the client device 104 and/or the server device 106.

In some embodiments, the network 102 may be configured to communicatively couple the client device 104, the server device 106, and the formjacking module 108 by way of communication links 110. Although not specifically shown in FIG. 1, the client device 104 may directly communicate with the server device 106 by way of the communication links 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
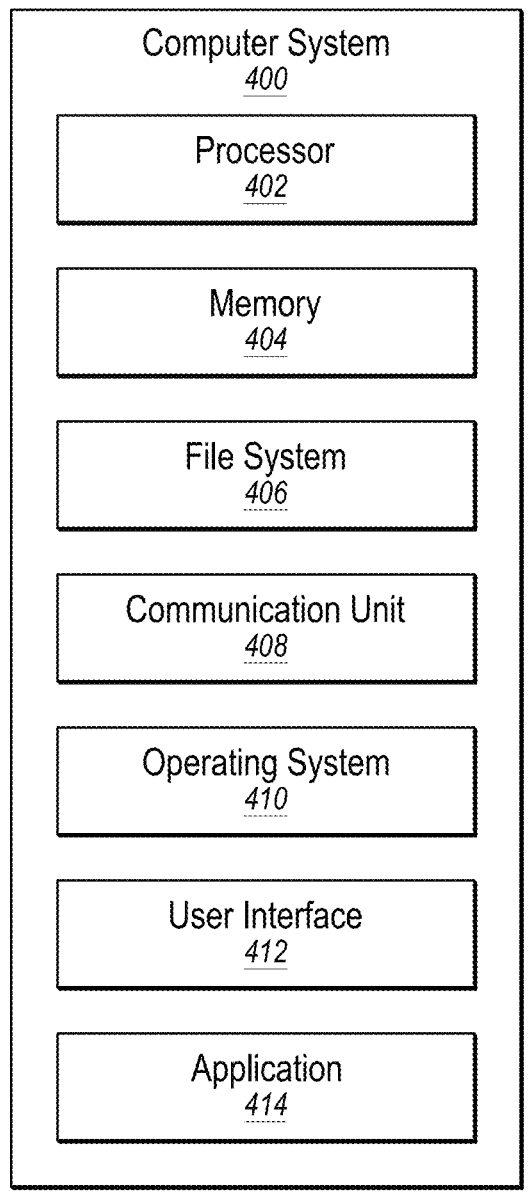
FIG. 4 illustrates an example computer system that may be employed in pre-filtering detection of an injected script on a webpage accessed by a computing device.

In some embodiments, the client device 104 may be any computer system capable of communicating over the network 102 and capable of pre-filtering the detection of maliciously injected or modified scripts into webpages, examples of which are disclosed herein in connection with the computer system 400 of FIG. 4. Similarly, in some embodiments, the server device 106 may be any computer system capable of communicating over the network 102 and capable of determining the injection or modification of scripts, comparing new data with historical data, analyzing scripts for malicious intent and action, and taking security actions to prevent or mitigate formjacking attacks disclosed herein in connection with the computer system 400 of FIG. 4.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Also, the formjacking module 108 may execute on the client device 104, the server device 106, or may execute on another device not illustrated in FIG. 1.

Figure 2:
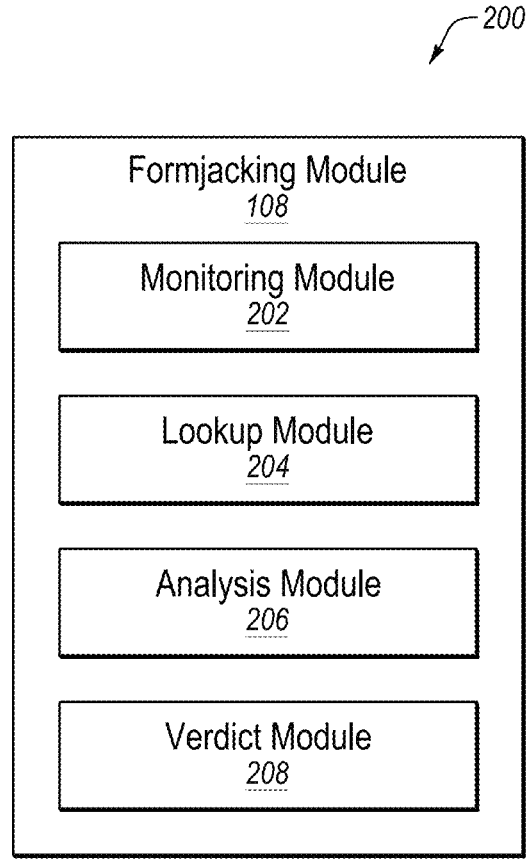
FIG. 2 illustrates an example system configured for pre-filtering detection of an injected script on a webpage accessed by a computing device.

FIG. 2 illustrates a block diagram of the formjacking module 108 described with reference to FIG. 1. In one embodiment, the formjacking module 108 may further comprise a monitoring module 202, a lookup module 204, an analysis module 206, and/or a verdict module 208. In one embodiment, the monitoring module 202 may be an entity running in a web browser 112. For example, the monitoring module 202 may be a browser extension, or a module of a security scanner running dynamically within the browser, a dynamic link library file, or a kernel module that monitors all web traffic occurring in the web browser 112. In an additional or alternative embodiment, the monitoring module 202 may be a module that does not exist on the end system itself (e.g., not on the client device 104 or the server device 106), but rather may be operating as a remote web proxy observing the web traffic between the end user and the webpage 116.

In one embodiment, the monitoring module 202 may monitor visits made by client device 104 to webpage 116. The monitoring module 202 may determine whether each visited webpage 116 contains a web form. For every webpage 116 that contains a web form, the monitoring module 202 notes the domains of the URLs of each of the different objects being requested by webpage 116. The objects may include image files, JavaScript libraries, iFrames, etc.; however, the formjacking module 108 is not interested in all of the documents, media, etc. on each of the webpages 116, but rather is only interested in webpages 166 that contain web forms where a user may enter data. Thus, monitoring module 202 may pass the traffic data to the lookup module 204 only where the traffic data associated with a web form.

In some embodiments, ignoring all web traffic that is not related to webpages 16 having web forms may improve performance and processing speed, as the number of requests that will need to be processed by the lookup module 204 and analyzed by the analysis module 206 is reduced. Furthermore, due to the reduced number of webpages 16 to be considered by the lookup module 204 and analysis module 206, the analysis to determine malicious scripts may be more aggressive, increasing the likelihood of detecting malicious attacks, and subsequently decreasing the false positive rate.

Whenever the monitoring module 202 determines a web form within the webpage 116, the monitoring module 202 then passes the webpage 116 and web form information and/or the execution load to the lookup module 204. In one embodiment, the lookup module 204 receives the information regarding the web form from the monitoring module and checks the domain on which the web form is hosted. For each webpage 116 received by the lookup module 204 from the monitoring module 202, the lookup module determines whether the webpage 116 has been visited.

The lookup module 204 may record the domains associated with each of the object requests and compare the domains with historical data related to previous visits to the webpage 116. In one embodiment, the comparison may be done offline using a local cache on the client device 104. In an additional or alternative embodiment, the lookup module 204 may do the comparison on the back end on the server device 106, or in the cloud. In an additional or alternative embodiment, the lookup module 204 may use a hybrid method to do the comparison, using both the local cache, and the back end or cloud databases.

If the lookup module 204 determines that the webpage 116 (associated with a web form) has not been visited before, then the lookup module 204 may add the webpage 116 to a list for future comparisons. The list may be stored in a local cache on the client device 104, on the server device 106, and/or on the cloud. In addition, the lookup module 204 may determine that the received webpage 116 contains scripts (e.g., PHP scripts, JavaScript, etc.) as well as other requests for other sources and/or objects from at least one domain. Thus, the lookup module 204 may determine associations between the web form on the webpage 116 and each of the domains associated from the scripts, sources, and/or objects. For example, the web form may communicate with domains associated with Google Analytics, Amazon Web Services, Facebook, Instagram, Wells Fargo Bank, etc., each of which may be expected and benign domains associated with, for example, a web form for a user to enter credit card information to purchase an item or a service.

If the lookup module 204 determines that the webpage 116 (associated with a web form) has been visited before, then the lookup module 204 does a comparison between the current instance of the webpage and a historical instance of the webpage 116. If the lookup module 204 determines that the webpage 116 has been visited before, the server device 106 will return a list of expected domains associated with the webpage 116. For example, if the webpage previous visited is the webpage 116 described above, then the expected domains may include Google Analytics, Amazon Web Services, Facebook, Instagram, and Wells Fargo Bank.

The lookup module 204 will determine whether the number of domains associated with the current webpage 116 is the same, fewer than, or greater than the number of domains expected to be associated with the current webpage 116 based on historical data. If the difference in the number of new domains obtained is zero or fewer than the number of expected domains, then the lookup module 204 will make a determination that there is no suspicious activity, and the execution of the web form is passed through the regular chain. Because the number of domains is as expected or fewer than expected, it would be statistically less likely that there has been any injected or modified scripts.

However, if the difference in the number of new domains obtained compared the number of expected domains is greater than one but fewer than a predetermined threshold, then the lookup module 204 marks the webpage 116 as suspicious and passes the webpage 116 domain to the analysis module 206 for further analysis and/or security actions (e.g., isolation). When the increase in the number of domains is just one or two (or a few), makes it statistically more likely that there is a malicious attack occurring.

In one embodiment, the predetermined threshold is established in order to filter out complete redesigns of a webpage 116 that might potentially lead to false positives. During a complete redesign, webpages 116 may add, delete, or change functionality, resulting in the need to make or change requests. Thus, multiple domains could be replaced, removed, added, and/or changed, which may result in the lookup module 204 incorrectly assuming suspicious formjacking. Thus, if the difference in the number of domains is higher than one or a couple (e.g., such as four or five or more), then it is more likely a webpage redesign than formjacking. In one example embodiment, the threshold may be set at four, where if the difference in the number of domains between the historical instance of the webpage 116 and the current webpage is greater than zero but fewer than or equal to the threshold of four, the lookup module 204 may determine the webpage 116 is suspicious.

In one embodiment, the threshold may be defined by way of analysis over time. For example, the formjacking module 108 may analyze the change of domains associated with a webpage 116 over a time period, such as a day, a week, a month, a year, etc., and determine what number of domains is more likely expected. In an additional or alternative embodiment, machine learning algorithms may be used to automatically determine and implement a reasonable threshold. In an additional or alternative embodiment, an administrator may manually set a threshold, or a user may manually set a threshold.

After marking the webpage 116 as suspicious, the lookup module 204 may send the webpage 116 data and associated domain information to the analysis module 206. The analysis module 206 may observe which new objects are being loaded by the webpage 116, and compare the new objects to the historical objects, scripts, domains, etc. associated with the webpage 116. The analysis module 206 may then do an analysis on the new objects, scripts, domains, etc. and determine if there is suspicious activity associated with the new objects, scripts, domains, etc. Thus, the analysis module 206 may make further confirmation that the webpage 116 is suspicious, and subsequently pass the webpage 116 data to the verdict module 208.

In some embodiments, the verdict module 208 may be a domain reputation service, where the verdict module 208 determines the reputation of the received domains, determines the age of the received domains, determines if there are digital signatures associated with the domains, and the like. The verdict module 208, may thus receive the analysis from the analysis module 206 and make a determination that the domain is malicious or benign. In one embodiment, the verdict module 208 may visit each domain to determine if there is suspicious activity. In an additional or alternative embodiment, the verdict module 208 may use machine learning to visit and "test" each domain. In an additional or alternative embodiment, the verdict module may pass the domain to a sandbox to do automatic checks on the domain for suspicious activity.

In an additional or alternative embodiment, verdict module 208 may also initiate a security action upon the determination that a domain is determined to be malicious. For example, the security action may include adding the domain to a blacklist (or a whitelist, if the domain is deemed benign), blocking access to the domain, setting up a firewall, setting up a proxy, sending an alert to the user or an administrator, and the like.

Two example embodiments are described. In one example embodiment, monitoring module 202 may receive a request to visit www.domain-A.com/form.html. In this example, the requested URL contains a web form, so the monitoring module 202 passes the domain www.domain-A.com/form.html to the lookup module 204. In one embodiment, the lookup module 204 is running on the server device 106. Thus, in one embodiment, the lookup module may send to the analysis module 206 a list of third-party domains historically associated with the web form (e.g., domain-1.com, domain-2.com, domain-3.com).

Analysis module 206 may then determine which objects are requested by the current session of www.domain-A.com/form.html. During this determination, analysis module 206 determines that www.domain-A.com/form.html requests objects from domain-1.com, domain-2.com, and domain-XX.com. Because domain-XX.com is new and unexpected, the analysis module 206 may pass domain-XX.com to the verdict module 208 for further analysis, to determine that domain-XX.com is malicious, or for verdict module 208 to take a security action. For example, the security action may be to place domain-XX.com on a blacklist, to block domain-XX.com, etc.

In one example embodiment, monitoring module 202 may receive a request to visit www.domain-A.com/form.html. In this example, the requested URL contains a web form, so the monitoring module 202 passes the domain www.domain-A.com/form.html to the lookup module 204. In one embodiment, the lookup module 204 is running on the server device 106. Thus, in one embodiment, the lookup module may send to the analysis module 206 a list of third-party domains historically associated with the web form (e.g., domain-1.com, domain-2.com, domain-3.com).

Analysis module 206 may then determine which objects are requested by the current session of www.domain-A.com/form.html. However, during this determination, analysis module 206 determines that www.domain-A.com/form.html requests objects from only domain-1.com, domain-3.com, and thus there is one fewer domain (e.g., domain-2.com) associated with www.domain-A.com/form.html. In this embodiment, the difference of having one fewer domain may be a result of dynamic calling, or may have been purposefully removed. Because the change in the number of domains is zero or fewer than the historically-expected number of domains, the formjacking module 108 does nothing further and resumes normal execution.

Although multiple modules 108, 202, 204, 206, and 208 are described as performing certain functions, any of the modules may be interchangeable, with each module performing any or all of the actions described. In one embodiment, the modules may perform the tasks on a single computing device, such as the client device 104 or the server device 106; however, in an additional or alternative embodiment, the modules may perform the tasks on multiple computing devices.

Figure 3:
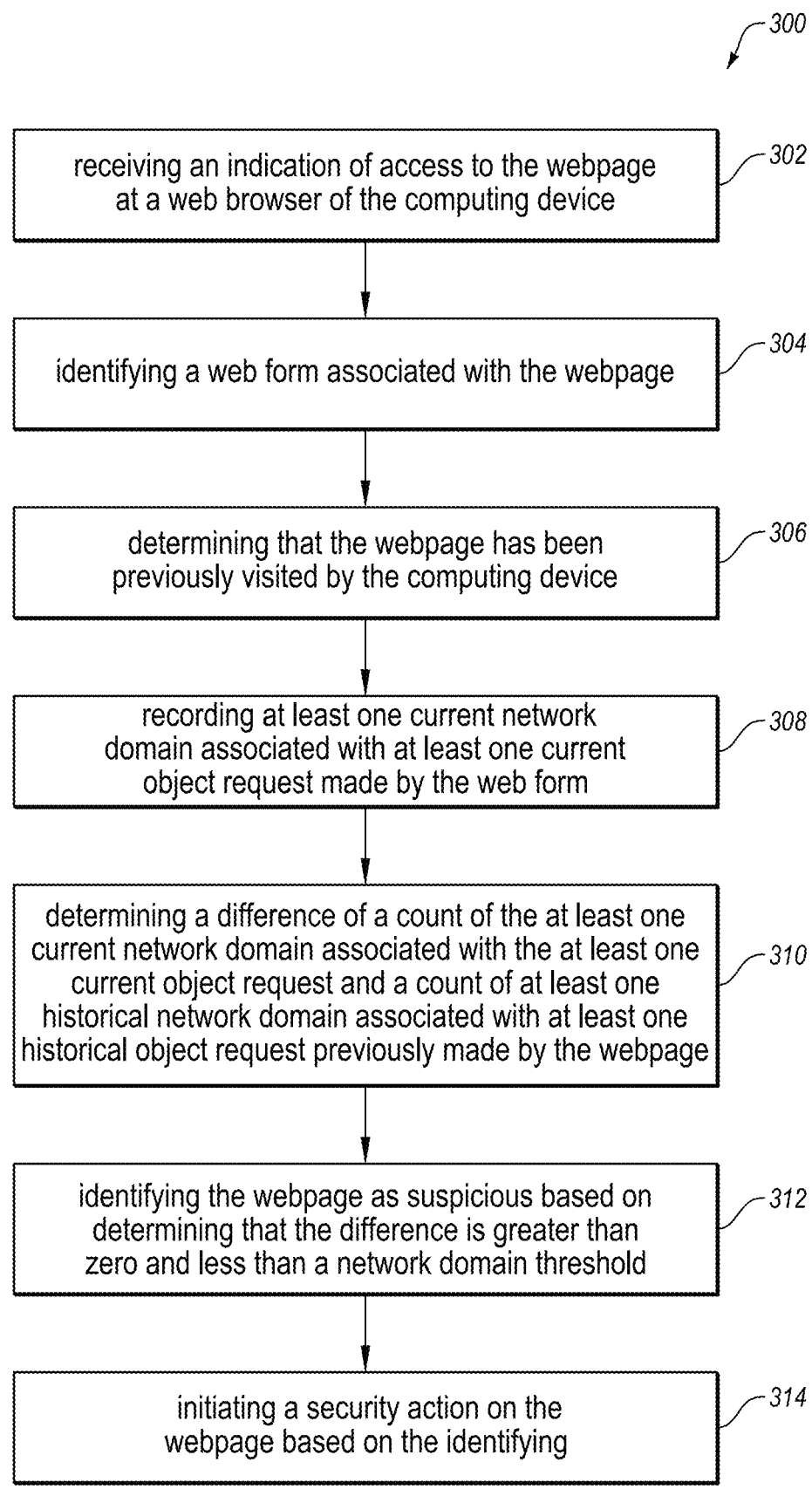
FIG. 3 illustrates a flowchart of an example method for pre-filtering detection of an injected script on a webpage accessed by a computing device.

FIG. 3 illustrates an example method 300 for pre-filtering detection of injected scripts on webpages accessed by a computing device. The method 300 may be performed, in some embodiments, by a device or system, such as by the client device 104, the server device 106, and/or the formjacking module 108. In these and other embodiments, the method 300 may be performed by one or more processors based on one or more computer-readable instructions stored on one or more non-transitory computer-readable media. The method 300 will now be described in connection with FIG. 1 and FIG. 2.

Method 300 may include, at action 302, receiving an indication of access to the webpage at a web browser of the computing device. For example, the monitoring module 202 may receive an indication that the web browser has received a request to access a specific webpage (e.g., a user navigating to a webpage, clicking on a link returned from a search query).

Method 300 may include, at action 304, identifying a web form associated with the webpage. For example, the monitoring module 202 may identify that the requested webpage 116 contains a web form into which a user may enter potentially private and security information such as personally identifiable information, financial information, etc. In the embodiment where the requested webpage 116 does not contain a web form, the formjacking module 108 may not take any further steps.

Method 300 may include, at action 306, determining that the webpage has been previously visited by the computing device. For example, the monitoring module 202 may determine whether the user (or another user) has previous visited the requested webpage 116, such that there may be a history of domains associated with the requested webpage 116 from a previous visit.

Method 300 may include, at action 308, recording at least one current network domain associated with at least one current object request made by the web form. For example, the monitoring module 202 may determine that the web form is associated with at least one object request, and that the at least one object request is associated with at least one network domain.

Method 300 may include, at action 310, determining a difference of a count of the at least one current network domain associated with the at least one current object request and a count of at least one historical network domain associated with at least one historical object request previously made by the webpage. For example, the lookup module 204 may compare at least one network domain determined at action 308 with a list of network domains historically associated with a previous visit to the web page.

Method 300 may include, at action 312, identifying the webpage as suspicious based on determining that the difference in the number of network domains greater than zero and less than a network domain threshold. For example, the analysis module 206 may determine that the difference in the number of domains is greater than zero (no change between access versions) but less than the network domain threshold (indicating a likely redesign of the webpage and not suspicious activity). Thus, if the difference in the number of domains falls is greater than zero but less than the network domain threshold, the webpage 116 may be marked as suspicious by the analysis module 206.

Method 300 may include, at action 314, initiating a security action on the webpage based on the identifying. For example, verdict module 208 initiating a security action such as adding the domain to a blacklist (or a whitelist, if the domain is deemed benign), blocking access to the domain, setting up a firewall, setting up a proxy, sending an alert to the user or an administrator, and the like.

Although the actions of the method 300 are illustrated in FIG. 3 as discrete actions, various actions may be divided into additional actions, combined into fewer actions, reordered, expanded, or eliminated, depending on the desired implementation.

The systems and methods described herein may provide a plurality of benefits and technological improvements, and may result in the practical application of identifying malicious formjacking attacks, minimizing the number of domains to analyze in identifying such attacks, and thus increasing the speed of detection and the speed of mitigation, while minimizing the processing costs. Furthermore, the systems and methods described herein provide a practical application of mitigating or preventing a malicious attack. In addition, mitigation of and prevention of security attacks serves the practical application of protecting personal, economic, financial, and other sensitive data.

Further, it is understood that the method 300 may improve the functioning of a computer system itself. For example, the functioning of the client device 104 itself may be improved by the method 300 by reducing or eliminating the opportunity for an attacker to take control of the client device. Also, the method 300 may improve the technological field of personal and business privacy and security stopping an attack before the attack occurs.

FIG. 4 illustrates an example computer system that may be employed in pre-filtering detection of an injected script on a webpage 116 accessed by a computing device. In some embodiments, the computer system 400 may be part of any of the systems or devices described in this disclosure. For example, the computer system 400 may be part of the client device 103, the server device 106, the formjacking module 108 of FIGS. 1 and 2, and any or all of the modules 202, 204, 206, and 208.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a wearable device (e.g., a smartwatch, heart rate monitor, oxygen detector, thermometer), a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more applications, such as the formjacking module 108 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as the formjacking module 108 of FIG. 1 and/or FIG. 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize The invention as claimed and various embodiments with various modifications as may be suited to the particular use contemplated.

The invention claimed is:

1. A computer-implemented method for pre-filtering detection of an injected script on a webpage accessed by a computing device, at least a portion of the method being performed by the computing device comprising one or more processors, the method comprising:
receiving an indication of access to the webpage at a web browser of the computing device;
identifying a web form associated with the webpage;
determining that the webpage has been previously visited by the computing device;
recording at least one current network domain associated with at least one current object request made by the web form;
identifying the webpage as a suspicious redesigned webpage by:
determining a difference in a number of network domains between historical instances of the webpage and the at least one current network domain is greater than zero and less than a network domain threshold, the network domain threshold being greater than one, wherein the historical instances are associated with at least one object request previously made by the webpage, and wherein the historical instances are associated with a previous visit by the computing device to the webpage; and
initiating a security action on the webpage based on identifying the webpage as the suspicious redesigned webpage.

2. The method of claim 1, wherein the security action comprises one or more of:
adding the webpage to a blacklist, isolating the webpage, blocking network access to the webpage, or transmitting a message to an administrator regarding the webpage.

3. The method of claim 1, wherein the receiving of the indication of access to the webpage at the web browser of the computing device further comprises:
receiving the indication of access by way of a browser extension executing in the web browser.

4. The method of claim 1, wherein the receiving of the indication of access to the webpage at the web browser of the computing device further comprises:
dynamically executing a security scanning application within the web browser.

5. The method of claim 1, wherein the receiving of the indication of access to the webpage at the web browser of the computing device further comprises:
monitoring web traffic occurring in the web browser with a kernel module.

6. The method of claim 1, wherein the receiving of the indication of access to the webpage at the web browser of the computing device further comprises:
receiving a communication from a remote web proxy, the remote web proxy monitoring web traffic between the computing device and a web server associated with the webpage.

7. The method of claim 1, wherein identifying of the web form associated with the webpage further comprises:
disregarding any webpage not identified as being associated with a web form resource.

8. The method of claim 1, further comprising:
establishing the network domain threshold using a machine learning algorithm, and wherein the network domain threshold is four.

9. The method of claim 1, further comprising:
after the identifying of the webpage as the suspicious redesigned webpage, determining that the webpage is malicious by at least one of: visiting the at least one current network domain, passing the at least one current network domain to a sandbox for an automatic malware check, evaluating a digital network domain is on a blacklist.

10. One or more non-transitory computer-readable media comprising one or more computer readable instructions that, when executed by one or more processors of a computing device cause the computing device to perform a method for pre-filtering detection of an injected script on a webpage accessed by the computing device, the method comprising:
receiving an indication of access to the webpage at a web browser of the computing device;
identifying a web form associated with the webpage;
determining that the webpage has been previously visited by the computing device;
recording at least one current network domain associated with at least one current object request made by the web form;
identifying the webpage as a suspicious redesigned webpage by:
determining a difference between a count of the at least one current network domain and a count of a historical network domain is greater than zero and less than a network domain threshold, the network domain threshold being greater than one, wherein the historical network domain is associated with the computing device previously visiting the webpage, and wherein the historical network domain is associated with a historical object request previously made by the webpage; and
initiating a security action on the webpage based on identifying the webpage as the suspicious redesigned webpage.

11. The one or more non-transitory computer-readable media of claim 10, wherein the security action comprises one or more of:
adding the webpage to a blacklist, isolating the webpage, blocking network access to the webpage, or transmitting a message to an administrator regarding the webpage.

12. The one or more non-transitory computer-readable media of claim 10, wherein the receiving of the indication of access to the webpage at the web browser of the computing device further comprises:
receiving the indication of access by way of a browser extension executing in the web browser.

13. The one or more non-transitory computer-readable media of claim 10, wherein the receiving of the indication of access to the webpage at the web browser of the computing device further comprises:
dynamically executing a security scanning application within the web browser.

14. The one or more non-transitory computer-readable media of claim 10, wherein the receiving of the indication of access to the webpage at the web browser of the computing device further comprises:
monitoring web traffic occurring in the web browser with a kernel module.

15. The one or more non-transitory computer-readable media of claim 10, wherein the receiving of the indication of access to the webpage at the web browser of the computing device further comprises:
   receiving a communication from a remote web proxy, the remote web proxy monitoring web traffic between the computing device and a web server associated with the webpage.

16. The one or more non-transitory computer-readable media of claim 10, wherein the identifying of the web form associated with the webpage further comprises:
   disregarding any webpage not identified as being associated with a web form resource.

17. The one or more non-transitory computer-readable media of claim 10, further comprising:
   establishing the network domain threshold using a machine learning algorithm.

18. The one or more non-transitory computer-readable media of claim 10, further comprising:
   after the identifying of the webpage as the suspicious redesigned webpage, determining that the webpage is malicious by at least one of: visiting the at least one current network domain, passing the at least one current network domain to a sandbox for an automatic malware check, evaluating a digital signature of the at least one current network domain; and determining that the at least one current network domain is on a blacklist.

19. A system for pre-filtering detection of an injected script on a webpage accessed by a computing device, the system comprising:
   a processor;
   a memory in electronic communication with the processor; and
   instructions stored in the memory, the instructions being executable by the processor to:
      receive an indication of access to the webpage at a web browser of the computing device;
      identify a web form associated with the webpage;
      determine that the webpage has been previously visited by the computing device;
      record at least one current network domain associated with at least one current object request made by the web form;
      identify the webpage as a suspicious redesigned webpage by:
         determining a difference in a number of network domains between historical instances of the webpage and the at least one current network domain is greater than zero and less than a network domain threshold, the network domain threshold being greater than one, wherein the historical instances are associated with at least one object request previously made by the webpage, and wherein the historical instances are associated with a previous visit by the computing device to the webpage;
      initiate a security action on the webpage based on identifying the webpage as the suspicious redesigned webpage.

20. The system of claim 19, the instructions being further executable by the processor to:
   after identifying of the webpage as the suspicious redesigned webpage, determine that the webpage is malicious by at least one of: visit the at least one current network domain, pass the at least one current network domain to a sandbox for an automatic malware check, evaluate a digital signature of the at least one current network domain; and
   determine that the at least one current network domain is on a blacklist.

\* \* \* \* \*